(12) United States Patent
Horiuchi et al.

(10) Patent No.: US 7,803,491 B2
(45) Date of Patent: Sep. 28, 2010

(54) SOLID ELECTROLYTE FUEL CELL CONFIGURATION

(75) Inventors: Michio Horiuchi, Nagano (JP); Shigeaki Suganuma, Nagano (JP); Misa Watanabe, Nagano (JP); Yasue Tokutake, Nagano (JP)

(73) Assignee: Shinko Electric Industries Co., Ltd., Nagano (JP)

( * ) Notice: Subject to any disclaimer, the term of this patent is extended or adjusted under 35 U.S.C. 154(b) by 1542 days.

(21) Appl. No.: 11/125,064

(22) Filed: May 9, 2005

(65) Prior Publication Data

US 2005/0249993 A1    Nov. 10, 2005

(30) Foreign Application Priority Data

May 10, 2004 (JP) ............................ 2004-140220
Feb. 10, 2005 (JP) ............................ 2005-034945

(51) Int. Cl.
*H01M 8/22* (2006.01)
*H01M 8/24* (2006.01)

(52) U.S. Cl. .................. 429/452; 429/544; 429/466; 429/505; 429/517

(58) Field of Classification Search .................. 429/12, 429/32
See application file for complete search history.

(56) References Cited

U.S. PATENT DOCUMENTS 5,336,570 A * 8/1994 Dodge, Jr. ..................... 429/31
5,925,477 A * 7/1999 Ledjeff et al. ................. 429/32
5,989,741 A * 11/1999 Bloomfield et al. ........... 429/32

2001/0044041 A1 11/2001 Badding
2002/0076597 A1* 6/2002 Chang et al. .................. 429/35
2003/0170520 A1 9/2003 Fujii et al.

FOREIGN PATENT DOCUMENTS

| DE | 196 24 887 A1 | 1/1997 |
| DE | 102 19 585 C1 | 11/2003 |
| EP | 1 333 517 A2 | 8/2003 |
| EP | 1 508 932 A2 | 2/2005 |
| JP | 2005063692 | 3/2005 |
| WO | WO 00/26980 A | 5/2000 |
| WO | WO 03/085760 A2 | 10/2003 |

OTHER PUBLICATIONS

Lee S-J J et al: "High Power-Density Polymer-ElectrolyteFuel Cells by Microfabrication" Proceedingsof the Electromechanicalsociety, NewYork, NY US, vol. 2000-3, 2000, pp. 121-136, XP002358431, p. 126.

* cited by examiner

*Primary Examiner*—Tracy Dove
(74) *Attorney, Agent, or Firm*—Paul & Paul

(57) ABSTRACT

A solid electrolyte fuel cell configuration provided with a single sheet shaped solid electrolyte substrate formed with a plurality of fuel cells and thereby not having a sealed structure, achieving a reduction of the size and a reduction of the cost, and able to improve the durability and improve the power generation efficiency, a single sheet shaped solid electrolyte substrate, in particular a solid electrolyte fuel cell configuration provided with a single sheet shaped solid electrolyte substrate, a plurality of anode layers formed on one side of the solid electrolyte substrate, and a plurality of cathode layers formed on the side opposite to the one side of the solid electrolyte substrate at positions facing the anode layers, the anode layers and cathode layers facing each other across the solid electrolyte substrate forming a plurality of fuel cells, the anode layers and cathode layers being connected in series.

7 Claims, 12 Drawing Sheets

FUEL GAS

SOLID ELECTROLYTE FUEL CELL CONFIGURATION

BACKGROUND OF THE INVENTION

1. Field of the Invention

The present invention relates to a solid electrolyte fuel cell configuration, more particularly relates to a solid electrolyte fuel cell configuration comprised of a solid electrolyte substrate formed with pluralities of anode layers and cathode layers and enabling a smaller size, greater thinness, and higher output by a simple structure not requiring sealing.

2. Description of the Related Art

In the past, fuel cell configurations have been developed and put into practical use as low polluting power generating means for taking the place of thermal power generation or as sources of electrical energy for electric cars for taking the place of engines fueled by gasoline etc. Considerable research is going on for increasing the efficiency and reducing the cost of such fuel cell configurations.

These fuel cell configurations generate power by various systems. Among these, there are types of fuel cell configurations using solid electrolytes. As one example of a fuel cell configuration using a solid electrolyte, there is one using a sintered body comprised of yttria-($Y_2O_3$) stabilized zirconia as an oxygen ion transfer type solid electrolyte layer. One side of this solid electrolyte layer is formed with cathode layers, while the other side is formed with anode layers. Oxygen or an oxygen-containing gas is supplied to the anode layer side, while methane or another fuel gas is supplied to the anode layer.

In the fuel cell configuration, the oxygen ($O_2$) supplied to the cathode layers is ionized to oxygen ions ($O^{2-}$) at the boundary between the cathode layers and solid electrolyte layer. The oxygen ions are transferred to the anode layers by the solid electrolyte layer and supplied to the anode layers. For example, they react with the methane ($CH_4$) gas, whereby finally water ($H_2O$) and carbon dioxide ($CO_2$) are produced. In this reaction, the oxygen ions release electrons, so a potential difference occurs between the cathode layers and the anode layers. Therefore, if attaching lead wires to the cathode layers and anode layers, the electrons of the anode layers flow through the lead wires to the cathode layer side resulting in the generation of power in the fuel cell configuration. Note that the drive temperature of this fuel cell configuration is about 1000° C.

However, in this type of fuel cell configuration, it is necessary to provide separate chambers comprised of an oxygen or oxygen-containing gas supply chamber at the cathode layer side and a fuel gas supply chamber at the anode layer. Since the layers are exposed to an oxidizing atmosphere and a reducing atmosphere under a high temperature, it is difficult to improve the durability of the fuel cells.

On the other hand, a fuel cell configuration has been developed comprised of a solid electrolyte layer provided at opposite sides with cathode layers and anode layers to form fuel cells placed in fuel gas, for example, mixed fuel gas comprised of methane gas and oxygen gas mixed together, so as to generate an electromotive force between the cathode layers and anode layers. In this type of fuel cell configuration, the principle of generation of the electromotive force between the cathode layers and the anode layers is similar to the case of the above fuel cell configuration of the separate chamber type, but it is possible to place the fuel cells as a whole in substantially the same atmosphere, so it is possible to use a single chamber in which a mixed fuel gas is supplied and possible to improve the durability of the fuel cells.

However, even in this single chamber type fuel cell configuration, the configuration has to be driven at a high temperature of about 1000° C., so there is the danger of explosion of the mixed fuel gas. To avoid this danger, if making the oxygen concentration a concentration lower than the ignition limit, the problem arises that carbonization of the methane or other fuel proceeds and the cell configuration performance drops. Therefore, a single chamber type fuel cell configuration able to use a mixed gas of a concentration of oxygen able to prevent the progress of carbonization of the fuel while preventing explosion of mixed fuel gas has been proposed (for example, see Japanese Unexamined Patent Publication (Kokai) No. 2003-92124).

The configuration of the proposed single chamber type fuel cell configuration is shown in FIG. 12A. This fuel cell configuration is structured by fuel cells including solid electrolyte layers stacked in parallel to the flow of the mixed fuel gas. The fuel cells are comprised of dense structure solid electrolyte layers 1 and porous cathode layers 2 and anode layers 3 formed at the two sides of the solid electrolyte layers 1. A plurality of fuel cells C1 to C4 of the same configuration are stacked inside a ceramic vessel 4. The fuel cells are sealed in the vessel 4 by end plates 9, 10 via fillers 7, 8.

The vessel 4 is provided with a feed pipe 5 for a mixed fuel gas including methane or another fuel and oxygen and an exhaust pipe 6 for the exhaust gas. The parts in the vessel 4 other than the fuel cells, that is, the spaces in the vessel 4 through which the mixed fuel gas and exhaust gas flow, are filled by the fillers 7, 8 for suitable separation. Therefore, when driven as a fuel cell configuration, there will no longer be any ignition even if there is mixed fuel gas within the ignition limit.

The fuel cell configuration shown in FIG. 12B is basically configured in the same way as the single chamber type fuel cell configuration shown in FIG. 12A. However, it is structured with the fuel cells including the solid electrolyte layers stacked in the axial direction of the vessel 4 perpendicular to the flow of the mixed fuel gas. In this case, the fuel cells are comprised of porous solid electrolyte layers 1 and porous cathode layers 2 and anode layers 3 formed at the two sides of the solid electrolyte layers 1. A plurality of fuel cells C1 to C5 of the same configuration are stacked in a vessel 4.

On the other hand, the fuel cell configuration explained above was of a type comprised of fuel cells accommodated in a chamber. A system has been proposed arranging a solid electrolyte fuel cell in or near a flame and using the heat of the flame to hold the solid electrolyte fuel cell at its operating temperature so as to generate power (for example, see Japanese Unexamined Patent Publication (Kokai) No. 6-196176). The configuration of this power generation system is shown in FIG. 13.

The fuel cell of the power generation system shown in FIG. 13 is comprised of a tubular body comprised of a zirconia solid electrolyte layer 1, an anode layer 3 comprising a fuel electrode formed at the outside of the tubular body, and a cathode layer 2 comprising an air electrode formed at the inside of the tubular body. The solid electrolyte fuel cell is arranged in a state exposing the anode layer 3 at the part of the reducing flame of the flame f generated from the combustion system 5 supplied with the fuel gas. By arranging it in this way, the radicals etc. present in the reducing flame are used as fuel, the cathode layer 2 inside the tube is supplied with air by convection or diffusion, and power is generated as a fuel cell.

In the single chamber type fuel cell configuration shown in FIGS. 12A and 12B, while not requiring strict separation of the fuel and air like with a solid electrolyte fuel cell configuration of the related art, an air-tight structure has to be adopted. Further, to enable drive under a high temperature, a plurality of sheet shaped solid electrolyte fuel cells were stacked and connected using interconnects having heat resistance and high electrical conductivity so as to raise the electromotive force. Therefore, a single chamber type fuel cell configuration using sheet shaped solid electrolyte fuel cells suffers from the problems of having a bulky structure and rising in cost. Further, at the time of operation of this single chamber type fuel cell configuration, the temperature is gradually raised until a high temperature so as to prevent cracking of the solid electrolyte fuel cells, so the time until startup is long and trouble is involved.

As opposed to this, in the tubular solid electrolyte fuel cell shown in FIG. 13, the flame is directly utilized. This type of fuel cell configuration does not require the solid electrolyte fuel cell to be accommodated in a sealed structure vessel and therefore has the feature of being an open type. Therefore, in this fuel cell configuration, the startup time can be shortened and the structure is simple. Therefore, this can be said to be advantageous for reducing the size, lightening the weight, and reducing the cost of the fuel cell configuration. Further, in the sense of directly using a flame, incorporation into general combustion systems or incineration systems becomes possible and use as a system for supplying power can be expected.

However, in this type of fuel cell configuration, since the anode layer is formed at the outside surface of the tubular solid electrolyte layer, the radicals in the flame cannot be supplied to the top half of the anode layer and therefore the entire surface of the anode layer formed at the outside surface of the tubular solid electrolyte layer cannot be efficiently utilized. Accordingly, the power generation efficiency was low. Further, since the solid electrolyte fuel cell was directly heated by the flame, it was susceptible to cracking and fracturing due to the sharp changes in temperature. The cracked or fractured solid electrolyte fuel cell then ended up breaking apart making generation of power impossible.

Further, if trying to obtain a high electromotive force in a solid electrolyte fuel cell configuration, as shown in FIGS. 12A and 12B, it was necessary to prepare and stack a plurality of fuel cells each comprised of a solid electrolyte layer formed with a cathode layer and anode layer on its two sides. Further, even in the case of a fuel cell comprised of a tubular solid electrolyte layer formed with a cathode layer and an anode layer at its inside surface and outside surface shown in FIG. 13, it is necessary to prepare the number of fuel cells corresponding to the magnitude of the electromotive force required. Therefore, when the output current may be small, but a high electromotive force is required, the configuration ends up becoming bulky and a reduction of size or reduction of cost cannot be achieved.

SUMMARY OF THE INVENTION

An object of the present invention is to provide a solid electrolyte fuel cell configuration comprised of a single sheet shaped solid electrolyte substrate formed with a plurality of fuel cells and thereby not having a sealed structure, achieving a reduction of the size and a reduction of the cost, and able to improve the durability and improve the power generation efficiency.

Another object of the present invention is to provide a solid electrolyte fuel cell configuration comprised of a plurality of sheet shaped solid electrolyte substrates each formed with a fuel cell and thereby not having a sealed structure, facilitating a change of shape to an irregular shape, achieving a reduction of the size and a reduction of the cost, and able to improve the durability and improve the power generation efficiency.

To achieve the first object, according to a first aspect of the invention, there is provided a solid electrolyte fuel cell configuration provided with a single sheet shaped solid electrolyte substrate, a plurality of anode layers formed on one side of the solid electrolyte substrate, and a plurality of cathode layers formed on the side opposite to the one side of the solid electrolyte substrate at positions facing the anode layers, the anode layers and cathode layers facing each other across the solid electrolyte substrate forming a plurality of fuel cells, the anode layers and cathode layers being connected in series.

Preferably, the serial connections are through conductor vias filled passing through the sheet shaped solid electrolyte substrate between the anode layers of the fuel cells and the cathode layers of adjoining fuel cells.

More preferably, both of the plurality of anode layers and the plurality of cathode layers have facing flat regions of the same shapes and have projections projecting out from the flat regions at the facing positions other than the anode layers or cathode layers at the fuel cells of the ends connected to the outside, and projections of the anode layers of the fuel cells and projections of cathode layers of adjoining fuel cells are connected to each other through conductor vias filled passing through the sheet shaped solid electrolyte substrate.

Still more preferably, the main flat regions of the anode layers and the cathode layers are rectangular, and the projections project out flat from first sides of the rectangular main regions to straight sides of the anode layers and cathode layers of adjoining fuel cells where no projections are provided.

Preferably, one of the plurality of anode layers and the plurality of cathode layers have the same rectangular flat regions, the other plurality have rectangular main flat regions facing the one plurality and recesses formed from first sides of the main regions so as not to short-circuit with the projections at second sides different from the first sides of the anode layer or cathode layer of adjoining fuel cells, and the projections are connected to facing anode layers or cathode layers through conductor vias filled passing through the sheet shaped solid electrolyte substrate.

More preferably, the plurality of anode layers and the plurality of cathode layers are arranged adjoining each other straight, and each anode layer and cathode layer are serially connected straight.

Still more preferably, the plurality of anode layers and the plurality of cathode layers are arranged in lattice-shaped or grid-shaped sections, and the anode layers and cathode layers of the fuel cells are serially connected straight at a first column, are serially connected at an end of the column to the next column of fuel cells, then are similarly successively serially connected.

Preferably, the serial connections are through metal wires passing through the sheet shaped solid electrolyte substrate which connect anode-side metal meshes embedded in or fastened to the anode layers of the fuel cells and cathode-side metal meshes embedded in or fastened to the cathode layers of adjoining fuel cells.

To achieve the second object, according to a second aspect of the invention, there is provided a solid electrolyte fuel cell configuration provided with a plurality of sheet shaped solid electrolyte substrates, an anode layer formed on one side of each of the solid electrolyte substrates, and a cathode layer formed on the side opposite to the one side of each of solid electrolyte substrates at a position facing the anode layer, the plurality of the anode layers and the plurality of the cathode layers facing each other across the solid electrolyte substrates forming a plurality of fuel cells, the plurality of fuel cells being serially connected through metal meshes embedded in or fastened to anode layers of the fuel cells at first ends and embedded in or fastened to cathode layers of adjoining fuel cells at second ends.

Preferably, the sheet shaped solid electrolyte substrates of the fuel cells are arranged across predetermined gaps from sheet shaped solid electrolyte substrates of adjoining fuel cells and are arranged on the same plane so that the cathode layers and anode layers face the same sides, and the metal meshes pass through the gaps and connect adjoining fuel cells.

More preferably, the plurality of fuel cells are arranged in lattice-shaped or grid-shaped sections, and are serially connected in each column by metal meshes extending from the anode layers of the fuel cells to the cathode layers of the adjoining fuel cells, are serially connected at the fuel cell at the end of that column with the fuel cells of the adjoining column, then are similarly successively serially connected.

Still more preferably, the plurality of fuel cells arranged in the lattice-shaped or grid-shaped sections are fastened by a frame-shaped fastening member arranged around them.

Still more preferably, the plurality of fuel cells are comprised of a plurality of cell groups of units of pluralities of fuel cells, and the plurality of fuel cells in each cell group are connected in parallel and the plurality of cell groups are connected in series by metal meshes with first ends embedded or fastened straddling anode layers of the plurality of fuel cells of the cell groups and with second ends embedded or fastened straddling cathode layers of the plurality of fuel cells of the adjoining cell groups.

Preferably, the plurality of fuel cells are arranged in a cylindrical shape.

More preferably, the plurality of fuel cells are arranged in two or more rings, and the anode-side metal meshes of end fuel cells of the rings and cathode-side metal meshes of fuel cells of adjoining rings are connected in series.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Preferred embodiments of the present invention will be described in detail below while referring to the attached figures.

Figure 13:
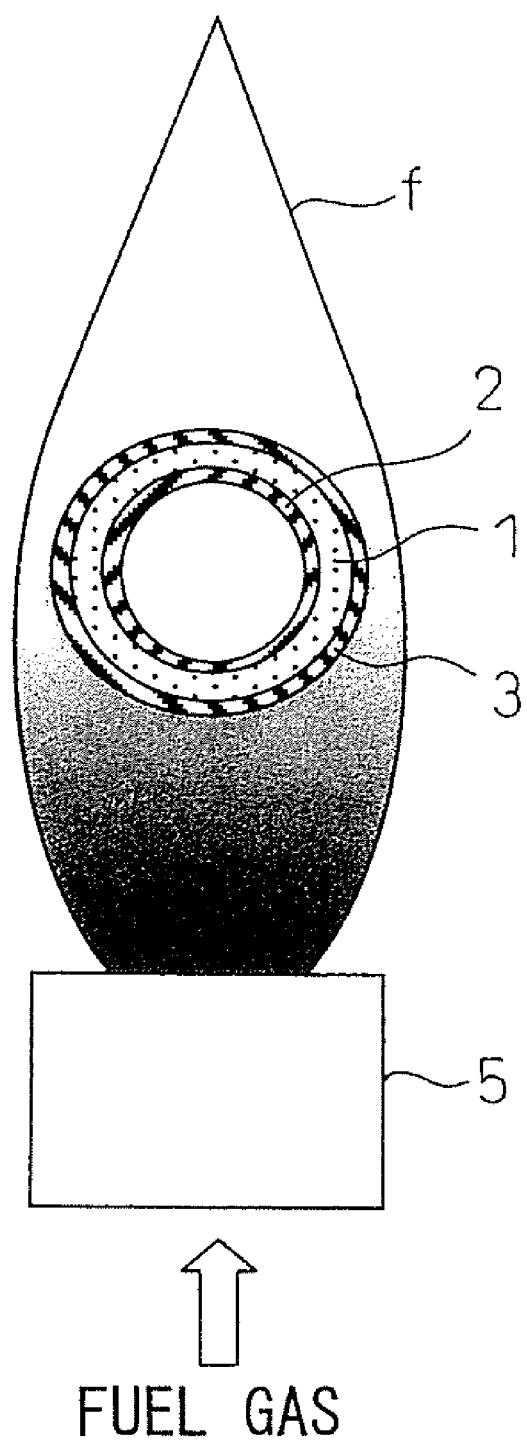
FIG. 13 is a view explaining the configuration of a solid electrolyte fuel cell using a flame according to the related art.

The solid electrolyte fuel cell configurations shown in these embodiments are solid electrolyte fuel cell configurations of types making direct use of flame as shown in FIG. 13.

First Embodiment

Figure 1A:
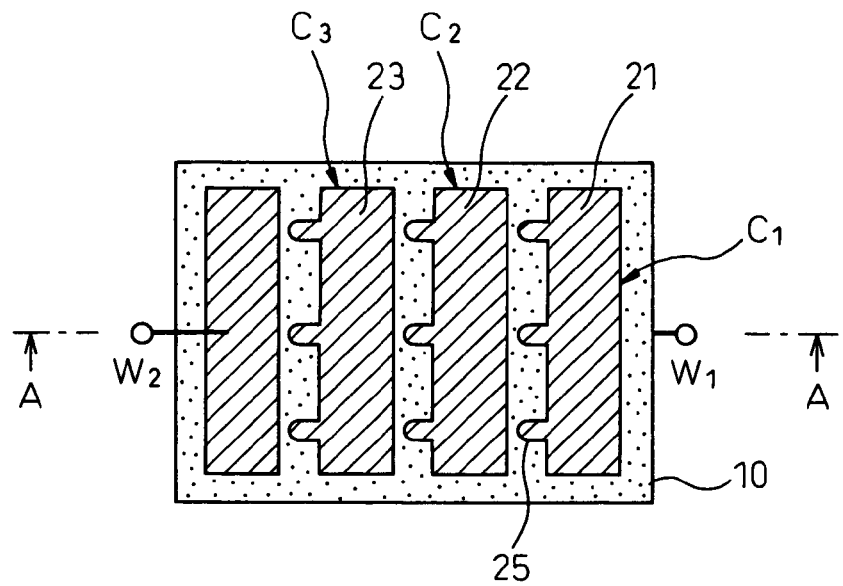
FIGS. 1A to 1C are views of a fuel cell configuration with via connections according to a first embodiment of the present invention.
Figure 1B:
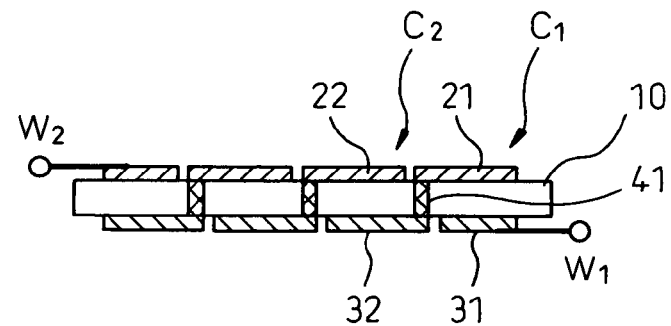
Figure 1C:
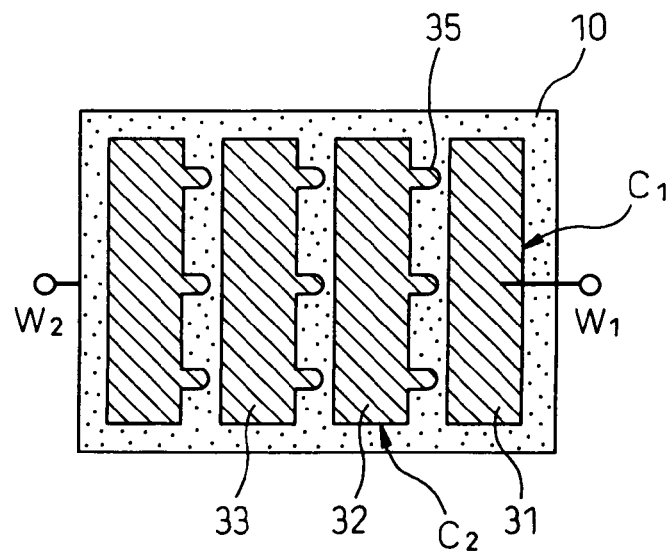

FIGS. 1A to 1C show the configuration of a solid electrolyte fuel cell configuration according to a first embodiment of the present invention. FIG. 1A is a plan view of the basic configuration viewing the solid electrolyte fuel cell configuration from an anode side, FIG. 1B is a cross-sectional view along the line A-A, and FIG. 1C is a plan view of the basic configuration viewed from a cathode side.

In the solid electrolyte fuel cell configuration making direct use of a flame according to the related art, the solid electrolyte layer was tubular in shape, so the ratio of exposure of the flame to the anode layer formed at the outside of the solid electrolyte layer was poor. Further, a single fuel cell was formed by a single tubular solid electrolyte layer. Therefore, in the solid electrolyte fuel cell configuration of the first embodiment, the solid electrolyte layer was shaped as a sheet. For example, a solid electrolyte substrate using a thin sheet was used. One surface of the solid electrolyte substrate was formed with a plurality of cathode layers (air electrode layers), while the other opposite surface was formed with a plurality of anode layers (fuel electrode layers). To enable the entire surfaces of the plurality of the anode layers to be exposed to the flame, a fluid fuel producing a flame by combustion, for example, a gaseous fuel such as methane or a liquid fuel such as methanol may be supplied.

As shown in FIG. 1A, the solid electrolyte fuel cell configuration of the first embodiment is comprised of a single solid electrolyte substrate 1 of a rectangular sheet shape, a plurality of, in FIGS. 1A to 1C, four, substantially rectangular, identically shaped anode layers (fuel electrodes) 21, 22 . . . formed on one surface, and four substantially rectangular, identically shaped cathode layers (air electrodes) 31, 32 . . . formed at facing positions on the opposite surface as shown in FIG. 1C. The anode layer 21 and cathode layer 31 form the fuel cell C1, while the anode layers 22 on and the cathode layers 32 on form the fuel cells C2 on.

The anode layers 21, 22 . . . , except for the final anode layer, have one or more, in FIG. 1A, three, projections 25 projecting out to the adjoining next anode layer 22 . . . . On the other hand, the cathode layers 31, 32 . . . , except for the initial cathode layer 31, are formed with projections 35 projecting out to the adjoining following cathode layer side at positions facing the projections 25 of the anode layers.

Further, the facing projections 25 of the anode layers and projections 35 of the cathode layers are electrically connected through vias 41 passing through the solid electrolyte substrate 1, for example, conductors made of conductive ceramic similar to the cathode layers. In this way, a plurality of fuel cells C1, C2 . . . are connected in series. The cathode layer 31 of the first arranged fuel cell C1 and the anode layer of the last arranged fuel cell have a lead wire W1 and a lead wire W2 connected to them.

Therefore, the methane gas or other fuel discharged from a plurality of through holes of a fuel feed pipe (not shown) arranged a predetermined distance from the anode 21, 22 . . . sides of the fuel cells C1, C2 . . . is burned to produce a flame which is supplied to the entire surfaces of the anode layers 21, 22 . . . . The fuel cells C1, C2 . . . are connected in series, so an output of a size of the sum of the electromotive forces of the plurality of fuel cells C1 and C2 is obtained between the lead wire W1 and lead wire W2.

The anode layers 21, 22 . . . of the fuel cells C1, C2 . . . in the first embodiment are formed in sheet shapes, so compared with tubular shapes, the flame can be applied evenly. Further, the anode layers 21, 22 . . . face the flame side, so the hydrocarbons, hydrogen, radicals (OH, CH, $C_2$, $O_2H$, $CH_3$), etc. in the flame can be easily utilized as fuel.

Further, if the group of the fuel cells C1, C2 . . . are sheets in shape, it is possible to block off the cathode layers 31, 32 . . . from the flame. It is possible to expose the cathode layers 31, 32 . . . to the atmosphere in the state with the anode layers 21, 22 . . . facing the flame side. Due to this, the fuel cell configuration made of the fuel cells C1, C2 . . . can easily utilize the oxygen in the atmosphere at the cathode layer 31, 32 . . . side and maintain the rich state in the open state. Note that the cathode layers 31, 32 . . . may be made to utilize oxygen more efficiently by supplying a gas containing oxygen (air, oxygen-rich gas, etc.) toward the cathode layers 31, 32 . . . .

Further, the fuel cells C1, C2 . . . are arranged in or near the flame, but they are more suitably arranged in the reducing flame near the base of the flame. By arrangement in the reducing flame, the hydrocarbons, hydrogen, radicals, etc. present in the reducing flame can be efficiently utilized as fuel. Further, they can be used well even at the anode layers which easily degrade due to oxidation. Therefore, the durability can be maintained.

The fuel for combustion may be any fuel which burns and oxidizes along with a flame (can burn). Phosphor, sulfur, fluorine, chlorine, or compounds of the same etc. may be mentioned, but an organic material not requiring treatment of the exhaust gas is preferable. As organic material fuels, methane, ethane, propane, butane, and other gases, hexane, heptane, octane, and other gasoline-based liquids, methanol, ethanol, propanol, and other alcohols, acetone and other ketones, various other organic solvents, edible oil, light oil, etc. may be mentioned. Among these, in particular, gases are preferable.

Further, the flame may be a diffusion flame or a premixed flame, but a diffusion flame is unstable and produces soot so easily causes a drop in functions of the anode layers, so a premixed flame is preferable. A premixed flame is stable and can be easily adjusted in size, so is more advantageous. Further, it is possible to adjust the concentration of the fuel to prevent the production of soot.

The solid electrolyte substrate 10 used may for example be a known substrate such as:
   a) YSZ (yttria-stabilized zirconia), ScSZ (scandia-stabilized zirconia), and zirconia-based ceramics doped with Ce, Al, etc.;
   b) SDC (samaria-doped ceria), SGC (gadolia-doped ceria), and other ceria-based ceramics; and
   c) LSGM (lanthanum gallate) and bismuth oxide-based ceramics Further, the anode layers 21, 22 . . . used may for example be known ones. The materials listed below may be used:
   d) Cermets of nickel and yttria-stabilized zirconia-based, scandia-stabilized zirconia-based, or ceria-based (SDC, GDC, YDC, or other) ceramics;
   e) Sintered bodies having conductive oxides (55 wt % to 99 wt %) as main ingredients (the "conductive oxide" is for example nickel oxide in which lithium is dissolved etc.);
   f) The materials mentioned in d) and e) containing metals comprised of the platinum group elements or their oxides in amounts of 1 to 10 wt % or so; etc.

Among these, d) and e) are particularly preferable.

Sintered bodies having conductive oxides as main ingredients of e) have superior oxidation resistance, so can prevent the drop in power generation efficiency due to the rise in the electrode resistance of the anode layers arising due to the oxidation of the anode layers or the peeling of the anode layers from the solid electrolyte layer. Further, as the conductive oxide, nickel oxide in which lithium is dissolved is suitable. Further, the materials mentioned in the above d) and e) may be augmented by metals comprised of the platinum group elements or their oxides to obtain high power generation performance.

The cathode layers 31, 32 . . . used may be known ones. For example, a manganese, gallium, or cobalt oxide compound of lanthanum to which strontium (Sr) or another Group III element of the Periodic Table is added (for example, lanthanum strontium manganite) (for example, lanthanum strontium cobaltite) may be mentioned.

The anode layers 21, 22 . . . and cathode layers 31, 32 . . . are formed together as porous members, but the solid electrolyte substrate in the first embodiment may also be formed porous. In the related art, the solid electrolyte layer was formed dense, but this was low in thermal shock resistance and easily cracked and fractured due to sharp temperature changes. Further, in general, the solid electrolyte layer is formed thicker than the anode layers and the cathode layers, so the cracking and fracturing of the solid electrolyte layer trigger cracking and fracturing of all of the fuel cells and causes them to break up.

By having the solid electrolyte substrate formed porous, when generating power, even if arranged in the flame or near the flame and sharply changed in temperature, cracking and fracturing etc. are eliminated even with heat cycles of sharp temperature differences and the thermal shock resistance is improved. Further, even if porous, when the porosity is less than 10%, no remarkable improvement can be recognized in the thermal shock resistance, but if 10% or more, a good thermal shock resistance is seen and if 20% or more it is even better. This is believed to be because if the solid electrolyte layer is porous, the heat expansion due to heating is eased by the pore parts.

The fuel cells C1, C2 . . . are for example produced as follows. First, the material powders of the solid electrolyte layer are mixed in predetermined ratios of mixture and shaped into a sheet. After this, the sheet is fired and sintered so as to produce a substrate as a solid electrolyte layer. By adjusting the types and ratios of mixture of the pore forming agent and other material powders, the firing temperature, the firing time, the pre-firing, and other firing conditions etc. at this time, it is possible to produce solid electrolyte layers with various porosities.

Next, the solid electrolyte substrate 10 is formed with through holes at positions for formation of the projections 25, 35 of the anode layers and cathode layers by a known method using for example drilling.

The thus obtained solid electrolyte substrate 10 is first filled with paste for forming the conductor vias made of the above-mentioned conductive ceramic in through holes formed at positions corresponding to the projections 25, 35 of the anode layer and cathode layer. One side of the substrate is then coated with paste in shapes forming the anode layers 21, 22 . . . , the other side is coated with paste in shapes forming the cathode layers 31, 32 . . . , then the result is fired, thereby producing a fuel cell configuration having a plurality of solid electrolyte fuel cells C1, C2 . . . on a single solid electrolyte substrate 10.

Further, simultaneously, the solid electrolyte fuel cells C1, C2 . . . are successively connected in series. That is, the anode layer 21 of the fuel cell C1 is connected to the cathode layer 32 of the next fuel cell C2 adjoining it via the projections 35, while the anode layer 22 of the fuel cell C2 is connected to the cathode layer 33 of the adjoining next fuel cell C3 via the projections 25, the conductive vias 41, and the projections 35. In this way, the cells are successively connected in series.

Second Embodiment

Figure 2A:
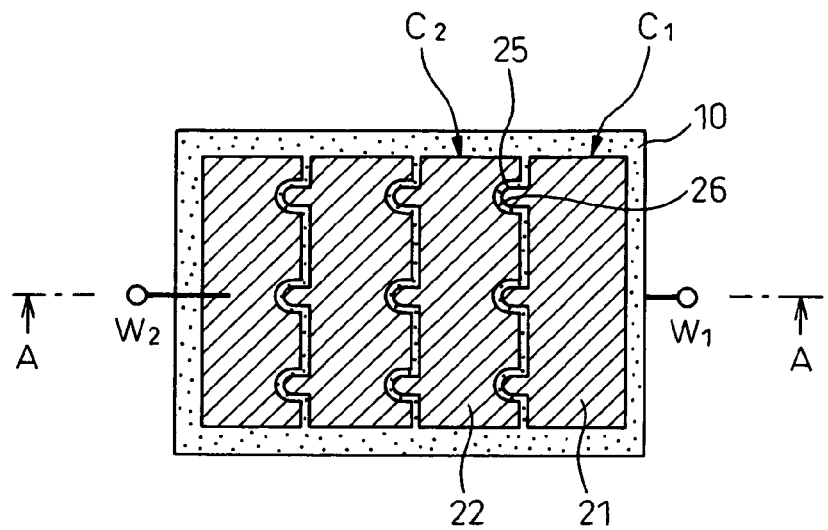
FIGS. 2A to 2C are views of a fuel cell configuration with via connections according to a second embodiment of the present invention.
Figure 2B:
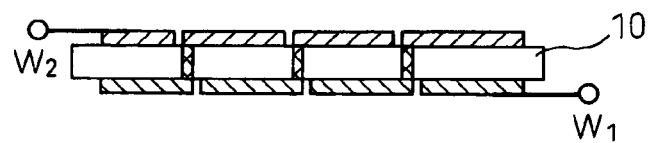
Figure 2C:
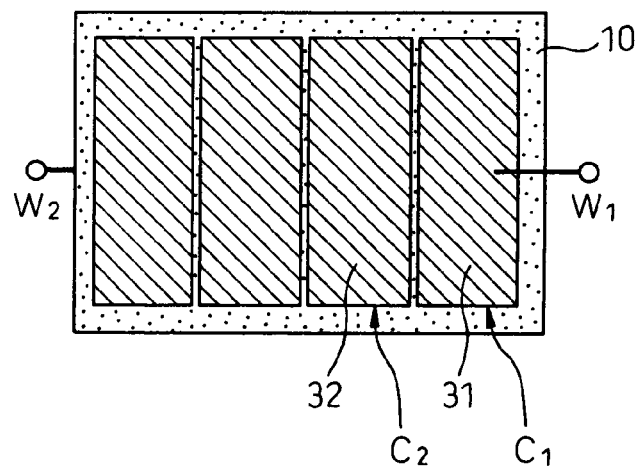

FIGS. 2A to 2C show the configuration of a solid electrolyte fuel cell configuration according to a second embodiment of the present invention. FIG. 2A is a plan view of the basic configuration viewing the solid electrolyte fuel cell configuration from an anode side, FIG. 2B is a cross-sectional view along the line A-A, and FIG. 2C is a plan view of the basic configuration viewed from a cathode side. Only the parts different from the first embodiment shown in FIGS. 1A to 1C will be explained.

In the first embodiment, both the plurality of rectangular anode layers 21, 22 . . . formed on one surface of the single solid electrolyte substrate 10 and the plurality of rectangular cathode layers 31, 32 . . . formed on the other surface have gaps between adjoining anode layers and cathode layers of at least the regions required for forming the projections 25, 35. In the second embodiment, however, the gaps between the adjoining anode layers and cathode layers are made narrower to increase the effective areas of the anode layers and cathode layers in the fuel cells.

That is, each of the rectangular anode layers 21, 22 . . . other than the final anode layer has one or more, in FIG. 2A, three, projections 25 projecting out from a first side to a second side of the adjoining next anode layer 22 . . . . On the other hand, the second side of each rectangular anode layer 22 . . . other than the first anode layer 21 is formed with recesses 26 at positions corresponding to the projections 25 of the adjoining previous anode layer 21, 22 . . . but not contacting the projections 25 so as to prevent short-circuits between the projections 25 and recesses 26.

On the other hand, the cathode layers 31, 32 . . . do not have projections or recesses at the opposite surface of the solid electrolyte substrate 10 corresponding to the projections 25 or recesses 26 of the anode layers and are formed into the same rectangular shapes as the anode layers 21, 22 . . . .

Further, the projections 25 of the anode layer 21 of the fuel cell C1 and the cathode layer 32 of the adjoining next fuel cell C2 are electrically connected through conductor vias 41 made of for example conductive ceramic passing through the solid electrolyte substrate 10. In this way, the plurality of fuel cells C1, C2 . . . are connected in series. The first arranged cathode layer and the last arranged anode layer have a lead wire W1 and a lead wire W2 connected to them. Further, a large output comprised of the sum of the electromotive forces of the plurality of fuel cells C1 and C2 is obtained between the lead wire W1 and the lead wire W2.

Therefore, in the same way as in the case of the first embodiment, the solid electrolyte substrate 10 is filled with paste for forming the vias made of the above-mentioned conductive ceramic in through holes formed at positions corresponding to the projections 25 of the anode layers 21, 22 . . . . One side of the substrate is then coated with paste in shapes forming the anode layers 21, 22 . . . , the other side is coated with paste in shapes forming the cathode layers 31, 32 . . . , then the result is fired, thereby producing a fuel cell configuration having a plurality of fuel cells C1, C2 . . . formed on a single solid electrolyte substrate 10 and connected serially with each other.

In the second embodiment, compared with the first embodiment, it is possible to increase the areas of the anode layers 21, 22 . . . and the cathode layers 31, 32 . . . with respect to the area of the solid electrolyte substrate 10. The shapes of the electrodes are simple as well. Despite this, it is possible to increase the density of the plurality of fuel cells C1 . . . .

Third Embodiment

Figure 3A:
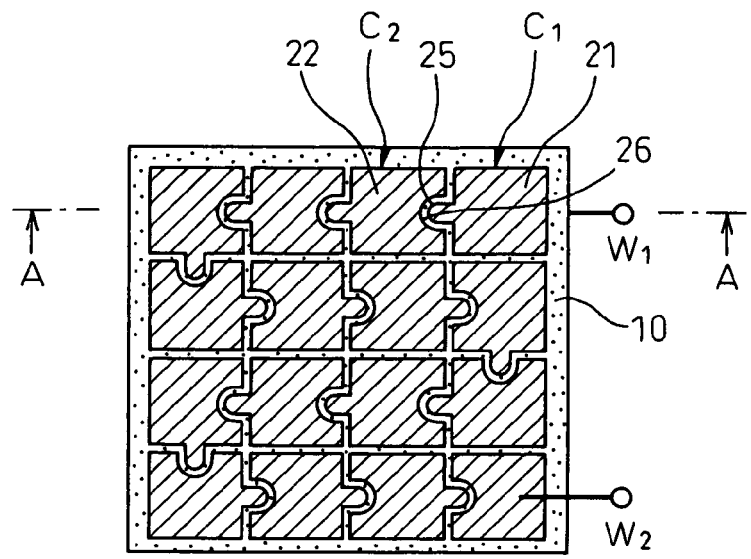
FIGS. 3A to 3C are views of a fuel cell configuration with via connections according to a third embodiment of the present invention.
Figure 3B:
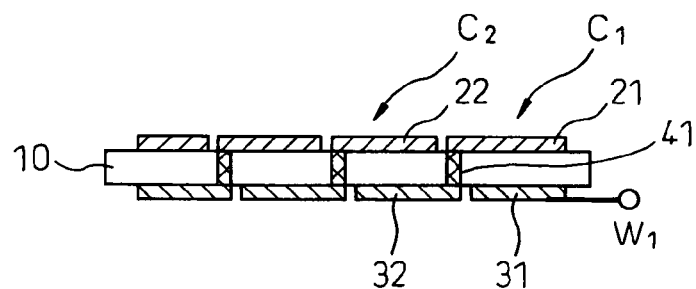
Figure 3C:
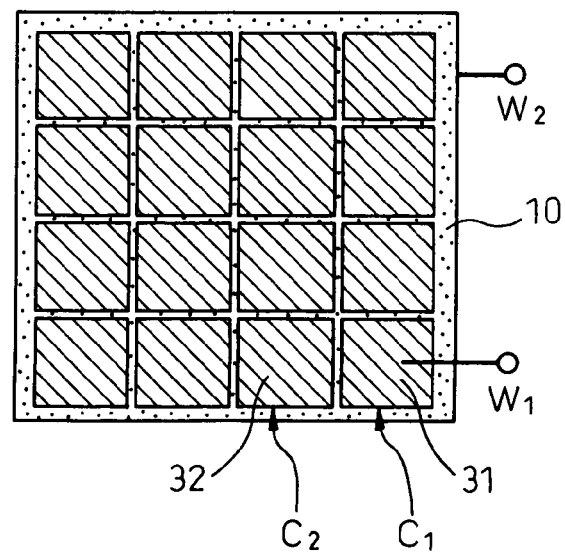

FIGS. 3A to 3C show the configuration of a solid electrolyte fuel cell configuration according to a third embodiment of the present invention. FIG. 3A is a plan view of the basic configuration viewing the solid electrolyte fuel cell configuration from an anode side, FIG. 3B is a cross-sectional view along the line A-A, and FIG. 3C is a plan view of the basic configuration viewed from a cathode side. Only the parts different from the second embodiment shown in FIGS. 2A to 2C will be explained.

In the third embodiment, a single solid electrolyte substrate 10 is formed with a total of (4×4=) 16 fuel cells C1, C2 . . . in lattice-shaped or grid-shaped sections in the vertical direction and horizontal direction. In the first column, the anode layers of the fuel cells and the cathode layers of the adjoining fuel cells are successively serially connected straight in the same way as the above embodiments, the anode layers of the fuel cells are connected at the ends of the column to the cathode layers of the adjoining fuel cells of the next column, then the anode layers are successively serially connected in the same way. By adopting this structure, it is possible to increase the number of unit fuel cells for a single solid electrolyte substrate 10 of the same area. While it is not possible to increase the output as a whole, it is possible to raise the electromotive force.

For example, in the embodiment shown in FIGS. 3A to 3C, four times the electromotive force can be obtained compared with the case of the second embodiment shown in FIGS. 2A to 2C. Therefore, for example, with an electromotive force of about 0.8V per unit fuel cell, an electromotive force of about 12.8V can be obtained.

Fourth Embodiment

Figure 4A:
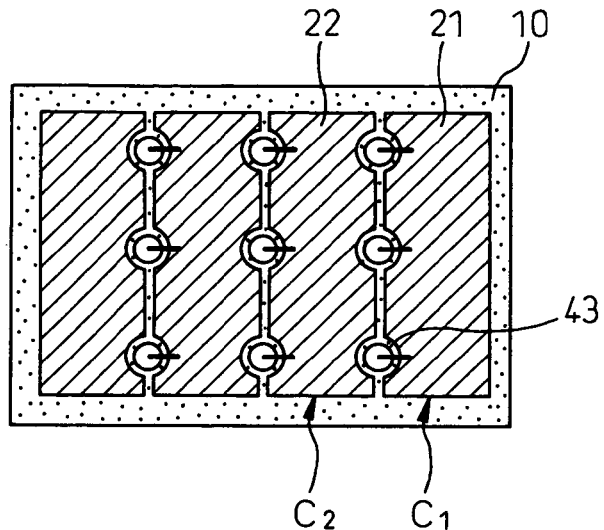
FIGS. 4A to 4D are views of a fuel cell configuration with metal wire and mesh connections according to a fourth embodiment of the present invention.
Figure 4D:
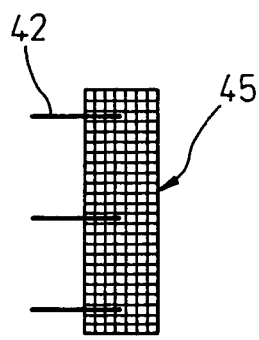
Figure 4B:
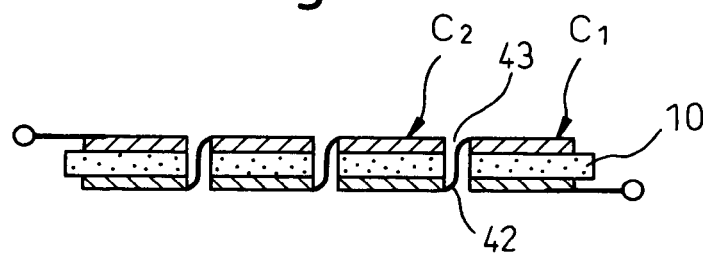
Figure 4C:
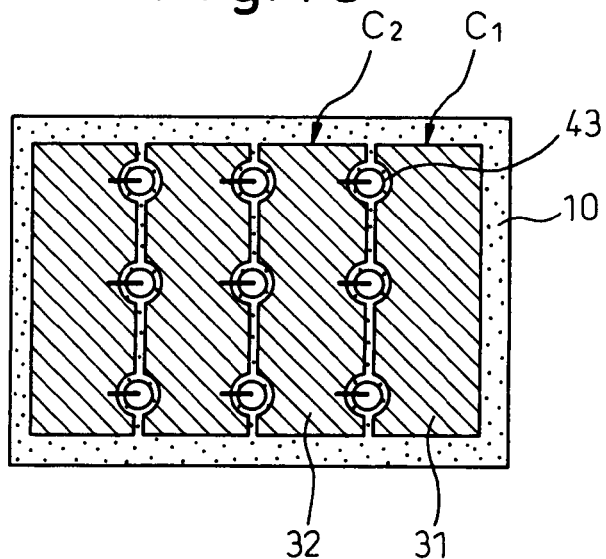

FIGS. 4A to 4D show the configuration of a solid electrolyte fuel cell configuration according to a fourth embodiment of the present invention. FIG. 4A is a plan view of the basic configuration viewing the solid electrolyte fuel cell configuration from an anode side, FIG. 4B is a cross-sectional view along the line A-A, FIG. 4C is a plan view of the basic configuration viewed from a cathode side, and FIG. 4D shows the metal wires and metal mesh used in this embodiment. In the fourth embodiment, only the parts different from the first and second embodiments shown in FIGS. 1A to 1C and FIGS. 2A to 2C will be explained.

In the above first to third embodiments, the anode layers of the fuel cells and the cathode layers of the adjoining fuel cells were connected serially through conductor vias passing through the solid electrolyte substrate 10, but in this embodiment, these are connected by connecting the anode-side metal meshes arranged above the anode layers of the fuel cells and the cathode-side metal meshes arranged above the cathode layers of the adjoining fuel cells and going through metal wires 42 passing through the sheet shaped solid electrolyte substrate.

In the fourth embodiment, the anode layers 21, 22 . . . and the cathode layers 31, 32 . . . at the sheet shaped fuel cells C1, C2 . . . have rectangular shapes similar to the anode layers and cathode layers in the second embodiment shown in FIGS. 2A to 2C. However, the anode layers 21, 22 . . . and cathode layers 31, 32 . . . have metal meshes 45 buried in or fastened to them. As one method of embedding them, the materials (pastes) of the different layers are coated on the solid electrolyte layer, then metal meshes are buried in the coated materials and the results are fired. As the method of fastening them, it is also possible to attach the metal meshes 45 by the materials of the layers without embedding them, then firing the results.

In the fourth embodiment, the metal mesh 45 embedded in or fastened to the anode layer 21 of the first fuel cell C1 and the metal mesh 45 embedded in or fastened to the cathode layer 32 of the adjoining next fuel cell C2 are connected through metal wires 42 passing through the solid electrolyte substrate 10.

As the metal meshes 45, ones superior in compatibility of coefficient of heat expansion with the cathode layers and anode layers which they are to be embedded in or fastened to and superior in heat resistance are preferable. Specifically, ones comprised of meshes of a metal made of platinum or a platinum-containing alloy are ideal. However, these would be expensive, so in practice SUS300 series (304, 316, etc.) or SUS400 series (430 etc.) stainless steels, Hastelloy, etc. may also be used. These are advantageous in the point of cost.

The metal meshes 45 not only function for fastening the metal wires 42, but also contribute to improvement of the current collecting ability and mechanical strength. Further, they are higher in heat conductivity than the electrode materials or the electrolyte materials, so improve the uniformity of heat of the fuel cells and as a result improve the thermal shock resistance. The first to third embodiments with no metal meshes 45 are advantageous in the point of lower cost at the time of uniform heating, but end up with temperature profiles at the solid electrolyte substrates and with heat expanding parts and nonexpanding parts at the time of uneven heating or rapid heating. As a result, there is the defect that the solid electrolyte substrates 10 easily crack due to the stress.

However, in this embodiment, since metal meshes 45 are embedded in or fastened to the cathode layers and anode layers, the heat evens out quickly, so such cracking becomes rare. Further, even if cracking occurs, power can continue to be generated so long as the metal wires 42 are not broken. In general, the higher the oxygen partial pressure at the cathode-surface side, the higher the output density, but in the structure of this embodiment, sometimes the parts of the through holes 43 cause a drop in this oxygen partial pressure (in the case of generating power using flames, a flow of low oxygen pressure gas occurs), so the diameters of the through holes 43 are preferably made as small as possible.

Note that it is also possible to arrange the fuel cells C1, C2 . . . in the structure of this fourth embodiment divided into a grid or lattice shape like in the third embodiment and connect them serially in the same way.

Fifth Embodiment

Figure 5A:
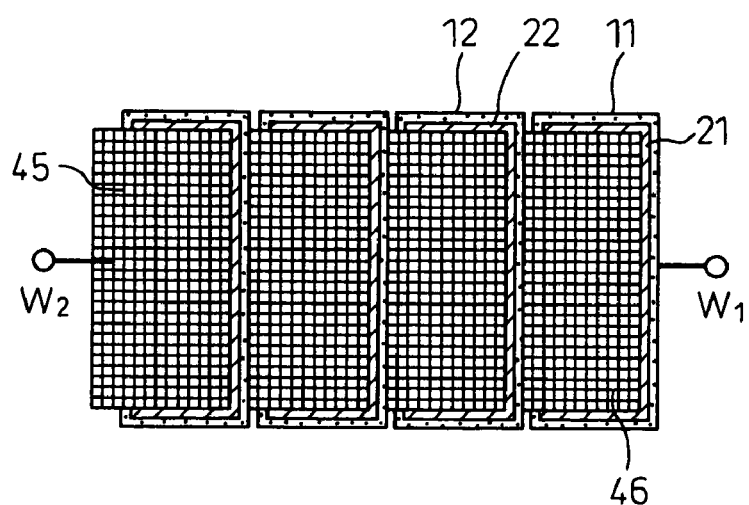
FIGS. 5A to 5D are views of a fuel cell configuration with separated substrates according to a fifth embodiment of the present invention.
Figure 5D:
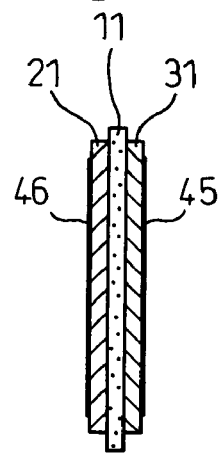
Figure 5B:
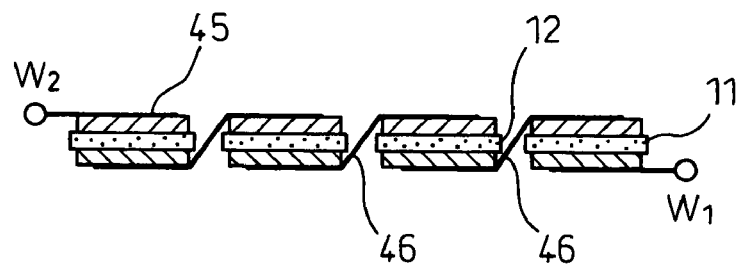
Figure 5C:
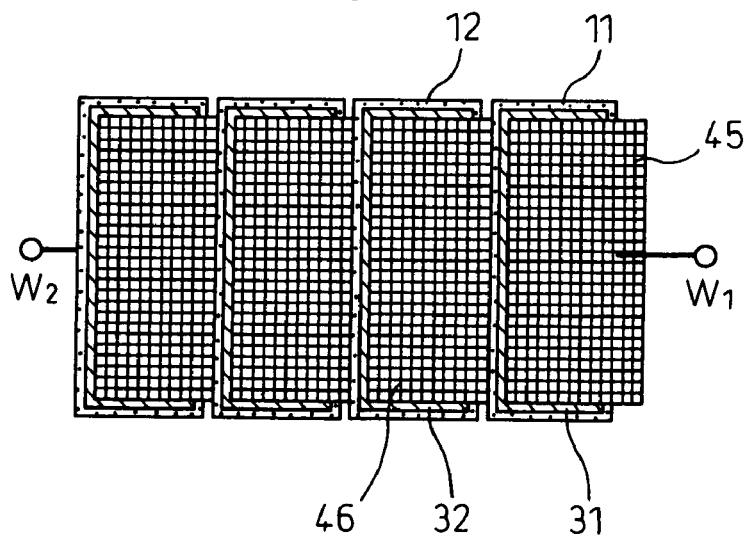

FIGS. 5A to 5D show the configuration of a solid electrolyte fuel cell configuration according to a fifth embodiment of the present invention. FIG. 5A is a schematic plan view of the solid electrolyte fuel cell configuration from an anode side, FIG. 5B is a cross-sectional view of the same, FIG. 5C is a plan view viewed from a cathode side, and FIG. 5D is a longitudinal cross-sectional view of a single fuel cell.

In the fifth embodiment, rather than using a single common sheet shaped solid electrolyte substrate 10 like in the first to fourth embodiments, a separate substrate is used for each fuel cell. That is, a plurality of, in the illustration, four, sheet shaped solid electrolyte substrates 11, 12 . . . of the same shapes are arranged with just slight gaps from each other. The solid electrolyte substrates 11, 12 . . . are formed at first surfaces with anode layers 21, 22 . . . and at surfaces opposite to the first surfaces with cathode layers 31, 32 . . . over substantially the entire surfaces of the substrates 11, 12 . . . so as to form fuel cells C1, C2 . . . .

The fuel cells are connected in series by the metal meshes 46 themselves instead of by metal wires 42 like in the fourth embodiment.

That is, in the same way as the fourth embodiment, the anode layers 21, 22 . . . and the cathode layers 31, 32 . . . have metal meshes 45, 46 embedded in or fastened to them. However, with the exception of the metal mesh 45 embedded in or fastened to the first fuel cell C1 and the metal mesh 45 embedded in or fastened to the anode layer of the last fuel cell, metal meshes 46 straddling the anode layers 21, 22 . . . of the fuel cells C1, C2 . . . and the cathode layers 32 . . . of the adjoining next fuel cells C2 . . . are used.

Further, the metal mesh 46 embedded in or fastened to the anode layer 21 of the first fuel cell C1 and the cathode layer 32 of the adjoining next fuel cell C2 has an intermediate part not embedded in or fastened to the analog layer 21 and cathode layer 32 passed through the gap between the fuel cells C1 and C2, that is, between the solid electrolyte substrates 11 and 12, to serially connect the fuel cells C1 and C2. The fuel cells C2 . . . and the adjoining next fuel cells are also similarly successively connected in series.

By adopting this structure, in the same way as the fourth embodiment, there is the advantage that it is possible to prevent cracking of the solid electrolyte substrate due to the quick evening of the heat and continue generating power even if cracks occur so long as the metal meshes 45, 46 do not break. Further, there is also the advantage that the connection strength between the fuel cells is higher than the case of the fourth embodiment. To prevent a drop in the oxygen partial pressure at the cathode side, the gaps between adjoining fuel cells should be made as narrow as possible and the weave of the metal meshes 45, 45 should be as fine as possible.

Further, another advantage of the fifth embodiment is that the flexibility of the group of the fuel cells is raised. In each of the structures of the first to fourth embodiments, a single sheet shaped solid electrolyte substrate was shared by the fuel cells, so the group of the plurality of fuel cells connected together was also limited in shape to a sheet. However, in the fifth embodiment, by deforming the shapes of the metal meshes connecting the adjoining fuel cells C1, C2 . . . , the structure of the fuel cell configuration itself can be deformed and for example a three-dimensional structure can be realized.

When producing a fuel cell configuration shown in FIGS. 5A to 5D, the solid electrolyte substrates 11, 12 . . . are fired, then the solid electrolyte substrates 11, 12 . . . are coated on first surfaces with paste for forming the anode layers 21, 22 . . . and on second surfaces with paste for forming the cathode layers 31, 32 . . . by printing or another method. The metal meshes 45, 46 are then embedded in or fastened to them and the pastes dried. Next, the fuel cell configuration as a whole is fired in the state maintaining the connection shapes as shown in FIG. 5B.

Sixth Embodiment

Figure 6A:
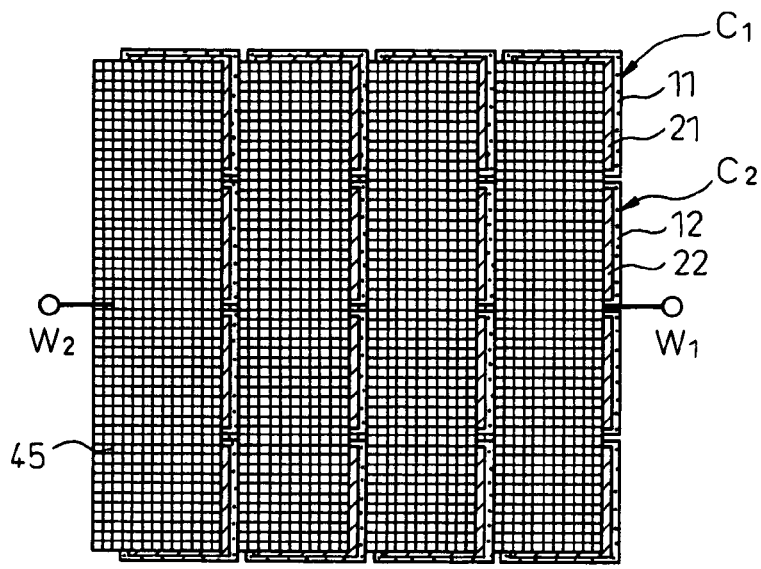
FIGS. 6A to 6E are views of a fuel cell configuration with separated substrates according to a sixth embodiment of the present invention.
Figure 6D:
Figure 6B:
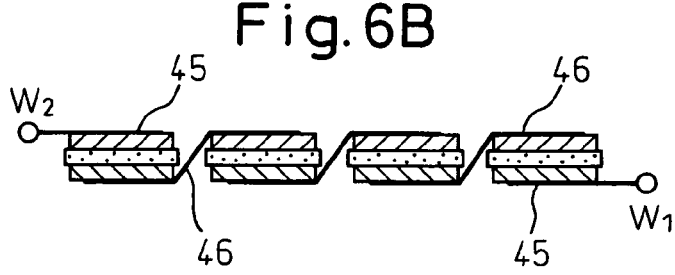
Figure 6E:
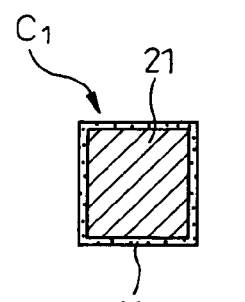
Figure 6C:
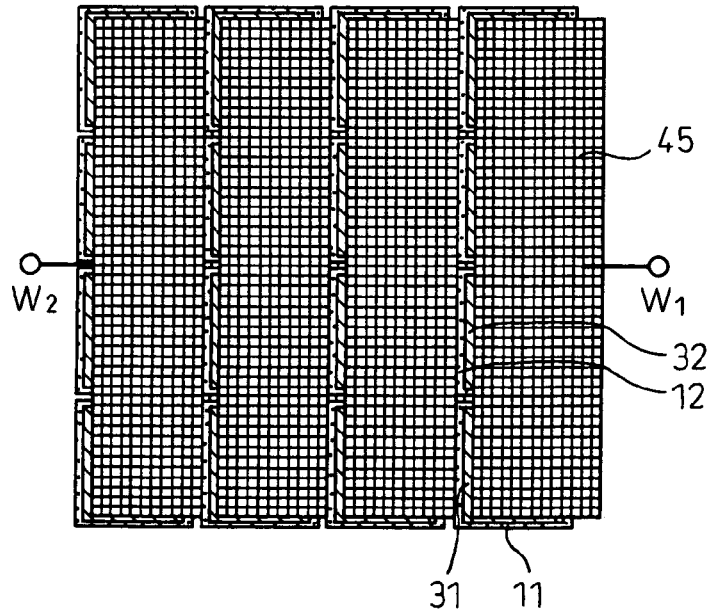

FIGS. 6A to 6E show the configuration of a solid electrolyte fuel cell configuration according to a sixth embodiment of the present invention. FIG. 6A is a schematic plan view of the solid electrolyte fuel cell configuration from an anode side, FIG. 6B is a cross-sectional view in the direction of serial connection, FIG. 6C is a schematic plan view viewed from a cathode side, FIG. 6D is a longitudinal cross-sectional view of the fuel cell configuration, and FIG. 6E is a plan view of a single fuel cell.

In the sixth embodiment, the individual fuel cells are further divided and the metal meshes are shared by adjoining fuel cells to form parallel connected structures. The unit fuel cells C1 . . . are comprised of, for example as shown in FIG. 6E, square, for example as illustrated, four, sheet shaped solid electrolyte substrates 11, 12 . . . arranged in a column. A plurality of such columns, for example, four, are arranged in the horizontal direction.

The solid electrolyte substrates 11, 12 . . . are formed on first surfaces with anode layers 21, 22 . . . and on surfaces at opposite sides to the first surfaces with cathode layers 31, 32 . . . over substantially the entire surfaces of the substrates 11, 12 to form the fuel cells C1, C2 . . . .

One column of fuel cells C1, C2 . . . are connected in parallel by common metal meshes 45, 46. That is, the anode layers 21, 22 . . . and the cathode layers 31, 32 . . . of the fuel cells C1, C2 . . . arranged in a column have common metal meshes 45, 46 embedded in or fastened to them to connect in parallel the plurality of fuel cells in the column.

With the exception of the metal mesh 45 embedded in or fastened to the cathode layers 31 . . . of the fuel cells C1, C2 . . . of the first column and the metal mesh 45 embedded in or fastened to the anode layers of the fuel cells of the last column, metal meshes 46 straddling the layers are used. For example, a metal mesh 46 straddling the anode layers 21, 22 . . . of the plurality of fuel cells C1, C2 . . . of the first column and the cathode layers of the plurality of fuel cells of the adjoining next column is used.

Further, the metal mesh 46 embedded in or fastened to the anode layers 21, 22 . . . of the fuel cells C1, C2 . . . of the first column and the cathode layers of the fuel cells of the adjoining next column has an intermediate part not embedded in or fastened to the analog layers 21, 22 . . . and cathode layers 32, 33 . . . passed through the gap between the fuel cells C1 and C2 of the first column and the fuel cells of the adjoining next column to serially connect the fuel cells C1, C2 . . . of the first column and the fuel cells of the next column. The fuel cells of the succeeding columns are also similarly successively connected in series.

According to this structure, by changing the number of the fuel cells per column, it is possible to form a cell group of any size. Therefore, even when fabricating a large group, it is possible to produce it without a drop in the cumulative yield. That is, when the fuel cells are large, there is a good probability that the solid electrolyte substrates will crack or otherwise become defective during the production process, but when the fuel cells are small, the probability of them becoming defective is low and even if defective, they can be easily replaced. Further, there is also the advantage that the ability to form the group of the large number of fuel cells into a three-dimensional shape is relatively high.

Seventh Embodiment

Figure 7A:
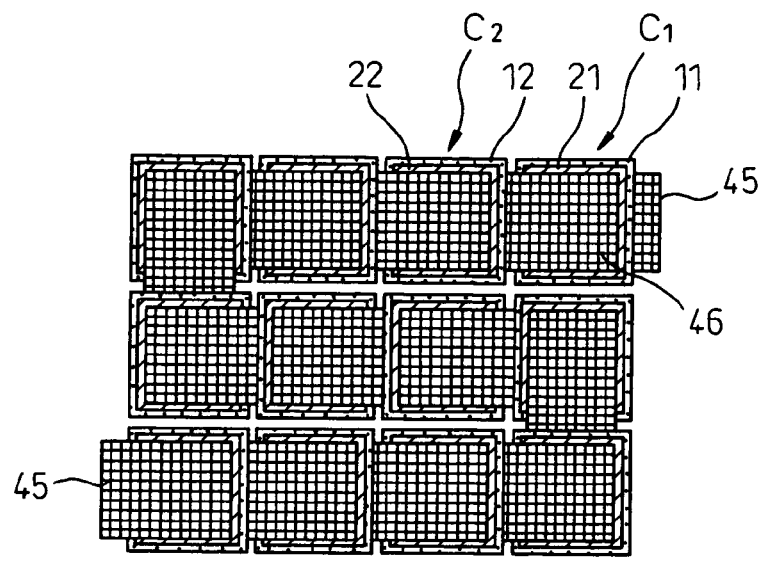
FIGS. 7A to 7C are views of a fuel cell configuration with a fastening member according to a seventh embodiment of the present invention.
Figure 7B:
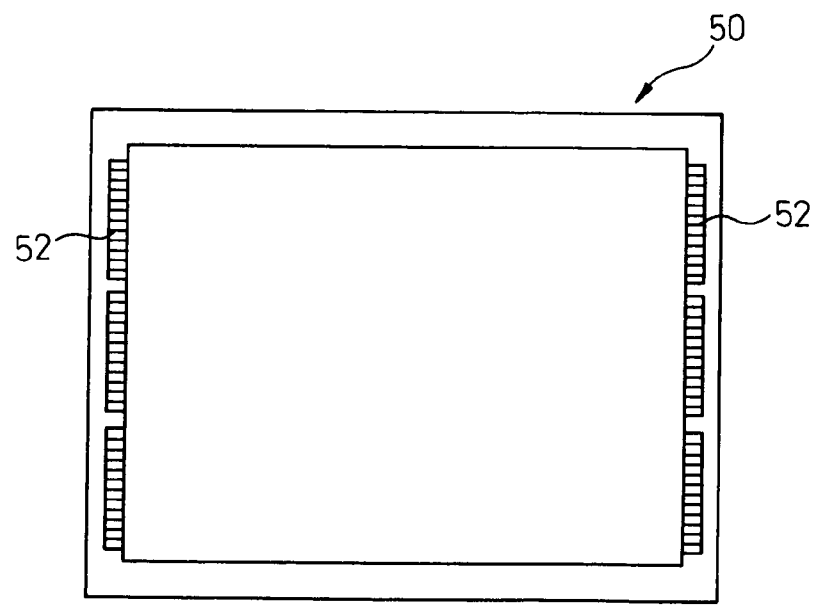
Figure 7C:
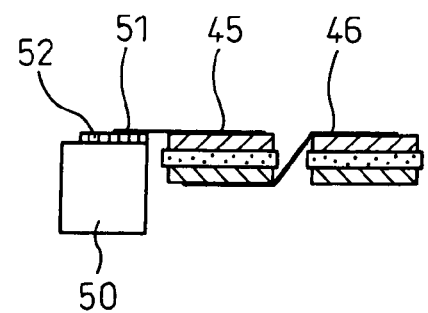

FIGS. 7A to 7C show the configuration of a solid electrolyte fuel cell configuration according to a seventh embodiment of the present invention. FIG. 7A is a schematic plan view of the solid electrolyte fuel cell configuration from an anode side, FIG. 7B shows the state of fastening the fuel cells by a frame-shaped holding member, and FIG. 7C is a cross-sectional view of a part where the fuel cell configuration is joined to the frame member.

In the seventh embodiment, the fuel cells are divided into smaller cells in the same way as the sixth embodiment. That is, the unit fuel cells C1, C2 . . . are comprised of, for example as shown in FIG. 6E, square, solid electrolyte substrates 11, 12 . . . formed with anode layers 21, 22 . . . on first surfaces and with cathode layers 31, 32 . . . on the surface at the opposite side to the first surfaces over substantially the entire surfaces of the substrates 11, 12 . . . . These unit fuel cells C1, C2 . . . are, as illustrated, arranged four to a row in the horizontal direction. A plurality of such rows, for example, three rows, are arranged in the vertical direction.

The metal meshes are also divided into smaller meshes for the individual fuel cells.

Metal meshes 46 embedded in or fastened to the anode layers 21, 22 . . . of the fuel cells C1, C2 . . . and embedded in or fastened to the cathode layers of the adjoining next fuel cells C2 . . . other than the cathode layer of the first fuel cell C1 and the anode layer of the last fuel cell serially connect these fuel cells C1, C2 . . . . The last fuel cell in a row is similarly serially connected with the first fuel cell of the next row. After this, the fuel cells are similarly serially connected. The cathode layer of the first fuel cell C1 and the anode layer of the last fuel cell have lead wires W1 and W2 connected to them using metal meshes embedded in or fastened to only the cathode layer and anode layer.

By adopting this structure, if just connecting the individual fuel cells, the fuel cells are connected in an S-shape. The group of the fuel cells are insufficiently fastened. Therefore, as shown in FIG. 7B, a frame-shaped member 50 comprised of ceramic or another heat insulating material in which the group of fuel cells can be held is provided. Insulated, separate metal layers 52 are formed at the side edges of the frame-shaped member 50. Extensions 51 of the metal meshes 45, 46 for connecting the fuel cells of the group of fuel cells (fuel cell configuration) are connected to these metal layers 52 by welding or other means. Note that to fasten a large number of fuel cells, it is also possible to provide, in addition to the frame-shaped member 50, a fastening use sheet to hold the group of fuel cells.

Eighth Embodiment

Figure 8:
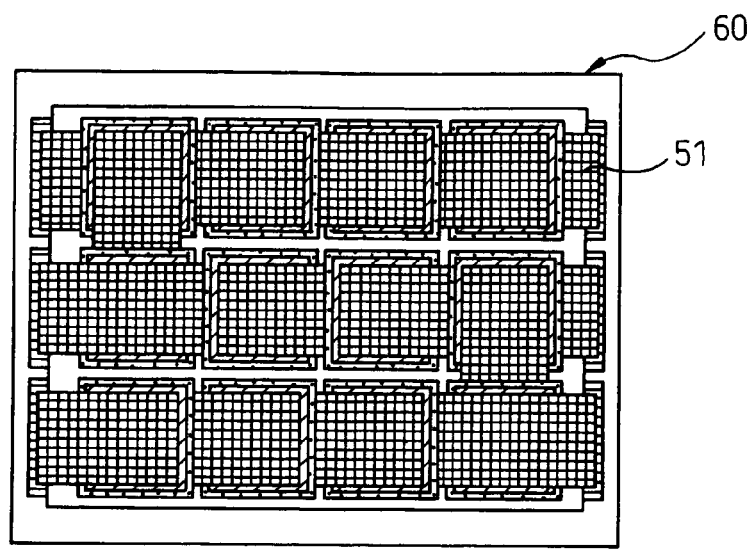
FIG. 8 is a view of a fuel cell configuration with a fastening member according to an eighth embodiment of the present invention.

FIG. 8 shows an eighth embodiment of the present invention and shows another fastening method using similar frame-shaped members as in the seventh embodiment shown in FIGS. 7A to 7C. A frame 60 not provided with any metal layers 52 such as shown in FIG. 7C may also have extensions 51 of metal meshes 45, 46 for connecting the fuel cells fas-

Ninth Embodiment

Figure 9A:
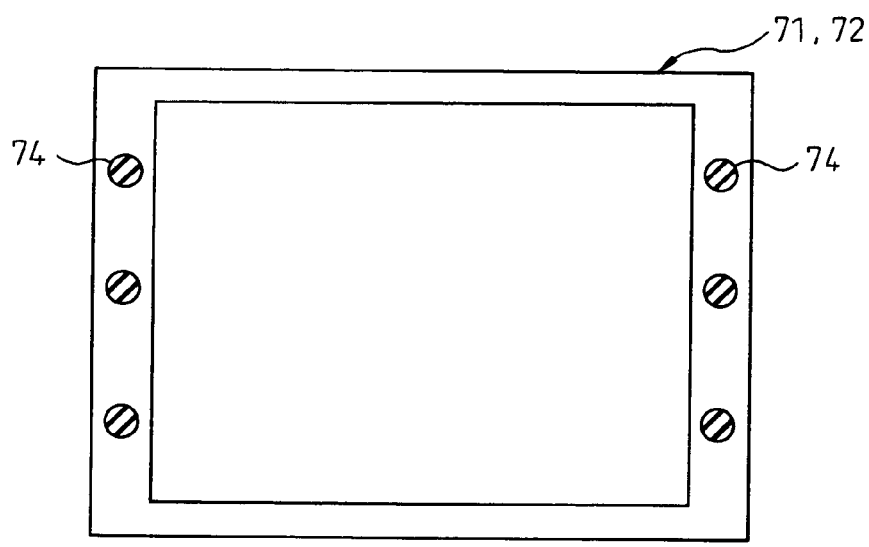
FIGS. 9A and 9B are views of a fuel cell configuration with fastening members according to a ninth embodiment of the present invention.
Figure 9B:
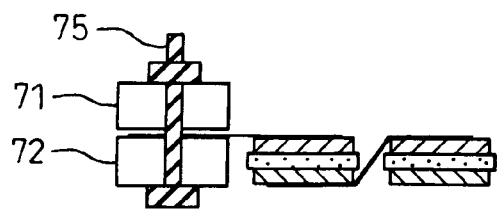

FIGS. 9A and 9B show a ninth embodiment of the present invention and show still another fastening method using similar frame-shaped members as in the seventh embodiment shown in FIGS. 7A to 7C. That is, in this embodiment, the metal meshes 45, 46 for connecting fuel cells are not directly joined to the frame-shaped member, but are fastened by being sandwiched between a pair of frame-shaped members.

A pair of frame-shaped members 71, 72 having through holes 74 sandwich between them the extensions 51 of the metal meshes 45, 46 for connecting the fuel cells and are fastened together by bolts and nuts 75. The through holes 74 may also be formed at positions away from the metal meshes 45, 46, but for more reliable fastening, preferably they are formed at the positions of the extensions 51 of the metal meshes 45, 46 and the frame-shaped members are fastened by bolts passing through the extensions 51 of the metal meshes 45, 46. It is not necessary to make both of the pair of fastening members frame shaped. It is also possible to make one a block shaped member having through holes corresponding to the fastening parts.

10th Embodiment

Figure 10A:
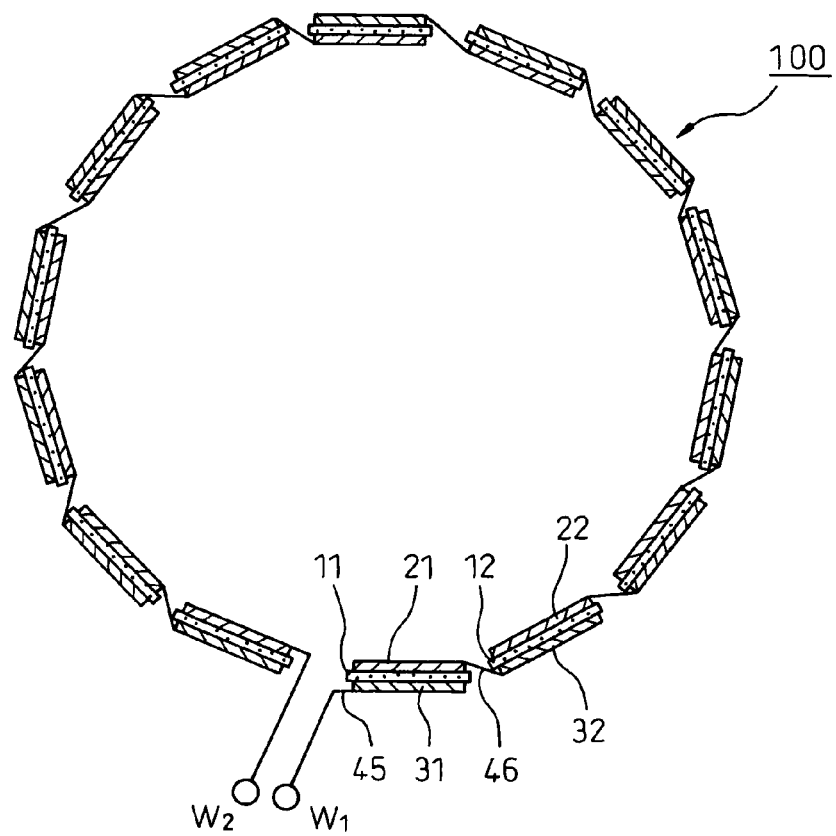
FIGS. 10A and 10B are views of a fuel cell configuration with a cylindrical shape according to a 10th embodiment of the present invention.
Figure 10B:
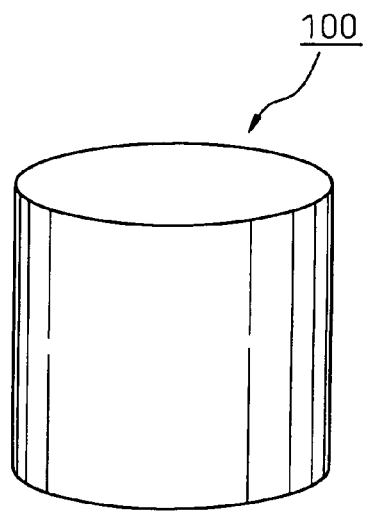

FIGS. 10A and 10B show a 10th embodiment of the present invention. FIG. 10A shows by a planar view a group of fuel cells 100 obtained by arranging a plurality of fuel cells in a ring, while FIG. 10B shows a perspective view of the same.

In the fifth to the ninth embodiments using pluralities of solid electrolyte substrates 11, 12 . . . , the connecting parts between adjoining fuel cells were made 180 degree planes. Rather than this, some angles may be given so as to obtain a group of fuel cells arranged cylindrically in structure.

In this case, fastening members similar to the fastening members in the previous embodiments are used for fastening the group of fuel cells in a cylindrical shape. For example, a pair of ring-shaped frames are provided, the pair of ring-shaped frames (not shown) sandwich the extensions of the metal meshes for connecting fuel cells between them, and the frames are fastened by bolts and nuts. Further, for example, these fastening members may also be provided above and below the cylindrical group of fuel cells for fastening.

By arranging the group of the fuel cells in a cylindrical structure in this way, it is possible to supply to the inside of the cylinder a gas fuel or a combustion flame of a gas or liquid fuel and open the outer circumference of the cylinder to the atmosphere and supply a flow of air there to promote power generation.

Note that in the embodiment shown in FIGS. 10A and 10B, single fuel cells are successively serially connected at the parts in the circumferential direction of the cylinder. It is also possible to similarly arrange a plurality of fuel cells at parts in the axial direction of the cylinder and connect part or all of these in parallel.

11th Embodiment

Figure 11A:
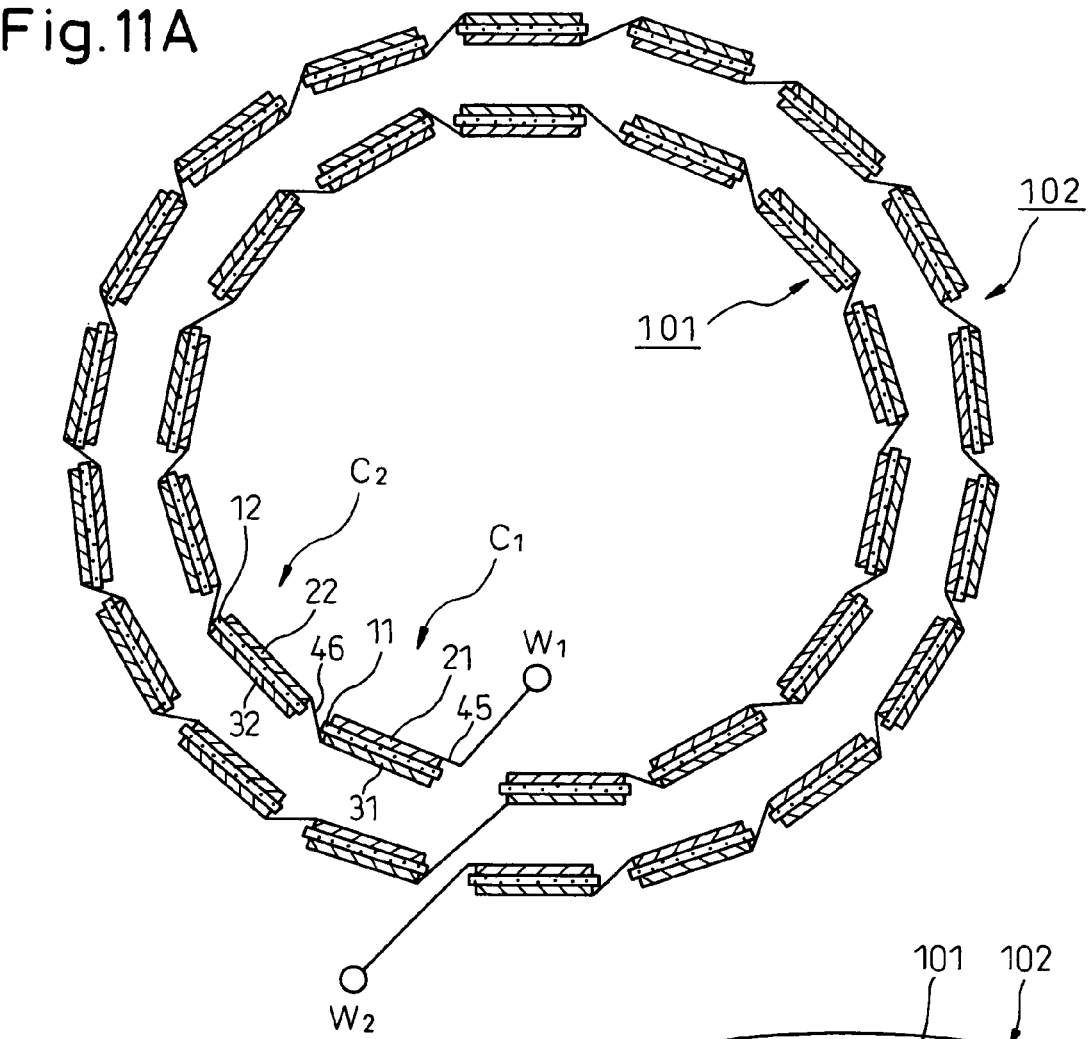
FIGS. 11A and 11B are views of a fuel cell configuration with a double-layer cylindrical shape according to an 11th embodiment of the present invention.
Figure 11B:
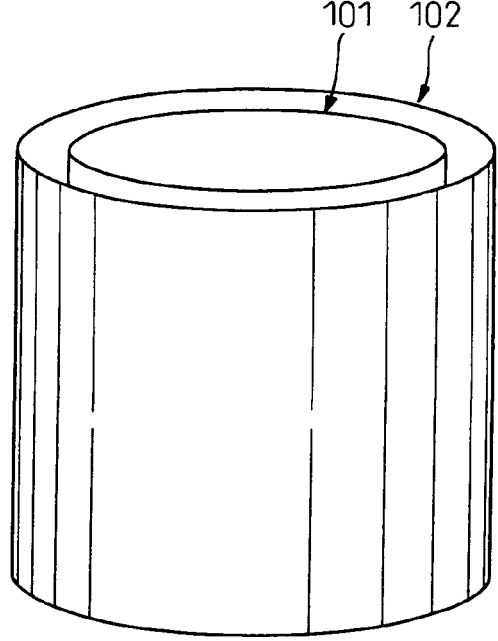
Figure 12A:
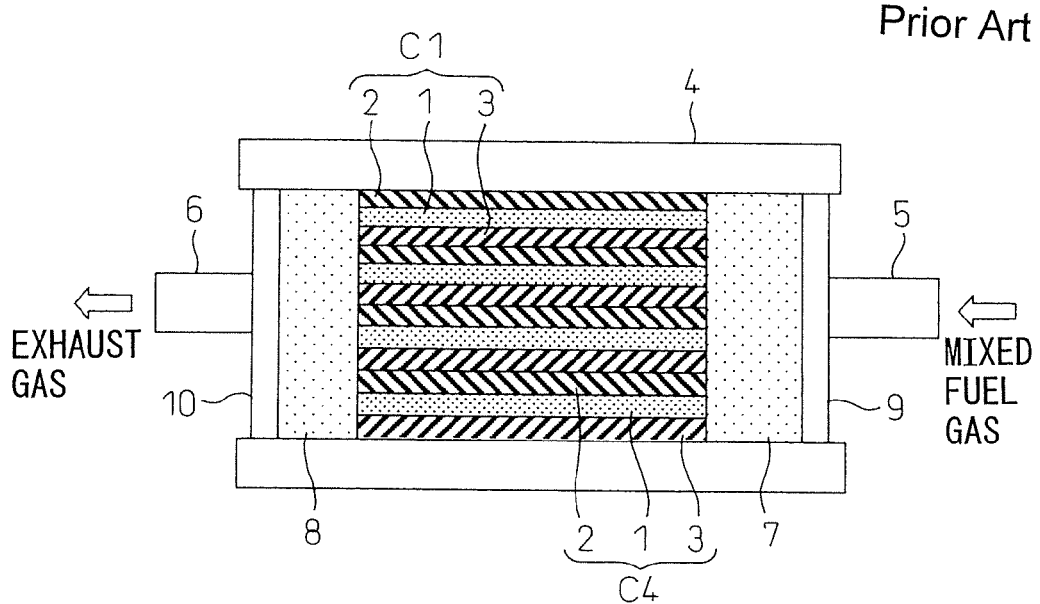
FIGS. 12A and 12B are views explaining the basic configuration of a solid electrolyte fuel cell using mixed fuel gas of the related art.
Figure 12B:
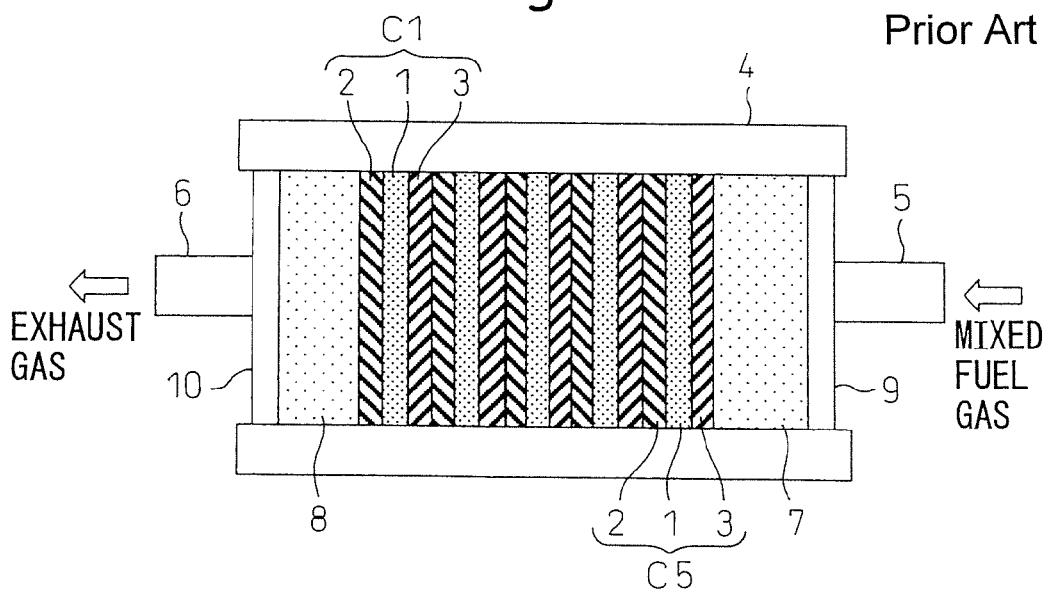

FIGS. 11A and 11B show an 11th embodiment of the present invention. FIG. 11A shows by a planar view a three-dimensional shape obtained using a plurality of fuel cells, that is, cylindrical fuel cell groups 101, 102 arranged in two rings, while FIG. 11B shows a perspective view of the same.

Basically, this embodiment is configured in the same way as the 10th embodiment shown in FIGS. 10A and 10B, but this embodiment is made a double-layer cylindrical structure. The serial connections between adjoining fuel cells of the same rings are made the same connection structures as well. The first and second rings are serially connected by a metal mesh with one end embedded in or fastened to the anode side (or cathode side) of the fuel cell at the end of one ring and with the other end embedded in or fastened to the cathode side (or anode side) of the fuel cell at the start of the second ring. By such a structure, it is possible to supply into the cylindrical space between the anodes a gas fuel or a combustion flame of a gas or liquid fuel and supply air into the cylindrical space between the cathodes to promote power generation.

Further, in the same way as the embodiment shown in FIGS. 10A and 10B, single fuel cells are successively serially connected at the parts in the circumferential direction of the cylinder. In the 11th embodiment as well, it is also possible to similarly arrange a plurality of fuel cells at parts in the axial direction of the cylinder and connect part or all of these in parallel.

EXAMPLE

A specific example applicable in common to the fifth to 11th embodiments shown in FIGS. 5A to 5C to FIGS. 11A and 11B will be explained next. As the solid electrolyte substrates 11, 12 . . . , SDC (samaria-doped ceria: $Ce_{0.8}Sm_{0.2}O_{1.9}$) substrates of external sizes of about 13 mm×5 mm were used.

First surfaces of the substrates 11, 12 . . . were coated with materials for forming the anode layers 21, 22 . . . comprised of pastes of 8 mol % Li-doped NiO-SDC: 25 wt %-70 wt % compositions to which 5 wt % $Rh_2O_3$ was added, while the second surfaces were coated with materials for forming the cathode layers 31, 32 . . . comprised of pastes of SSC (samaria strontium cobalt: $Sm_{0.5}Sr_{0.5}CoO_3$)-SDC: 50 wt %-50 wt % compositions.

Platinum meshes of external sizes of about 13 mm×15 were embedded in the paste coated layers of the two sides so as to remain sticking out.

Due to this, a fuel cell configuration unit cell precursor comprised of a platinum mesh/anode forming paste layer/solid electrolyte substrate/cathode forming paste layer/platinum mesh was obtained.

This unit cell precursor was fired in the atmosphere at 1200° C. to obtain a fuel cell configuration unit cell.

The anode side platinum mesh of one unit cell and the cathode side platinum mesh of another unit cell between adjoining unit cells were welded to connect adjoining unit cells as shown by 45, 46 of FIG. 5B so as to serially connect 34 unit cells and obtain a solid electrolyte fuel cell configuration according to the present invention.

Light oil was used as a fuel and the diffusion flame from a wick was brought into contact with the side surface of the above solid electrolyte fuel cell configuration so as to investigate the power generation behavior. Some fluctuation was seen due to the instability of the flame, but the maximum circuit voltage was about 25V and the output was 144 mW.

As explained above, according to the present invention, since both sides of a single sheet shaped solid electrolyte substrate are formed with a plurality of cathode layers and a plurality of anode layers to provide a plurality of fuel cells and since the flame obtained by burning the fuel supplied is brought into contact with the entire surface of all of the anode layers, power can be generated efficiently. Further, by connecting a plurality of fuel cells in series, it is possible to increase the electromotive force of the fuel cell configuration by a simple configuration and possible to realize a reduced size and reduced thickness of the fuel cell configuration.

Further, in a fuel cell configuration comprised of a plurality of solid electrolyte substrates, even if one of the solid electrolyte substrates breaks down, replacement is easy. Further, in production of a solid electrolyte fuel cell configuration, defective fuel cells can be easily removed and replaced with good cells and the overall yield can be improved.

While the invention has been described with reference to specific embodiments chosen for purpose of illustration, it should be apparent that numerous modifications could be made thereto by those skilled in the art without departing from the basic concept and scope of the invention.

What is claimed is:

1. A solid electrolyte fuel cell configuration, open to the atmosphere, is provided with:
   a plurality of sheet shaped planar solid electrolyte substrates,
   an anode layer formed on one side of each of said solid electrolyte substrates, and
   a cathode layer formed on the side opposite to said one side of each of solid electrolyte substrates at a position facing said anode layer,
   the plurality of said anode layers and the plurality of said cathode layers facing each other across said solid electrolyte substrates forming a plurality of fuel cells arranged in a plane,
   the plurality of fuel cells being serially connected through a plurality of metal meshes each respectively embedded in or fastened to an anode layer of a respective said fuel cell at a first end and embedded in or fastened to a cathode layer of a respective adjoining fuel cell at a second end,
   where a single solid electrolyte substrate has a single anode layer on one side of the substrate and a single cathode layer on the other side of the substrate to form a single fuel cell,
   where a plurality of said single fuel cells are arranged with predetermined gaps there between,
   where a respective metal mesh has one end embedded in or fastened to the anode layer of a respective cell and the other end embedded in or fastened to the cathode layer of a cell adjacent to said cell,
   where a metal mesh alone is present in the gap between a plurality of cells,
   where the plurality of cells are provided with an anode layer, a cathode layer and a solid electrolyte layer, which are porous, and
   where the plurality of cells are open to the atmosphere and have an anode side arranged in a flame and a cathode side exposed to the atmosphere or an oxygen-containing gas, thereby generating electric power.

2. A solid electrolyte fuel cell configuration as set forth in claim 1,
   wherein: said sheet shaped solid planar electrolyte substrates are arranged with predetermined gaps there about and on the same plane with each respective cathode layer facing the same side and each respective anode layer facing the same opposite side, and
   wherein each said metal mesh passes through a said gap to connect an adjoining fuel cell.

3. A solid electrolyte fuel cell configuration as set forth in claim 2,
   wherein: a plurality of fuel cells are arranged in lattice-shaped or grid-shaped sections having a plurality of columns and
   wherein the fuel cells in each column are serially connected by metal meshes extending from the anode layers of the fuel cells to the cathode layers of the adjoining fuel cells, and
   wherein each column is connected to an adjoining column by a serial connection of the fuel cell at the end of that column with the fuel cell at the end of the adjoining column 4. A solid electrolyte fuel cell configuration as set forth in claim 3, wherein the plurality of fuel cells arranged in the lattice-shaped or grid-shaped sections are fastened by a frame-shaped fastening member arranged around them.

5. A solid electrolyte fuel cell configuration as set forth in claim 4,
   wherein: said plurality of fuel cells are each comprised of a plurality of cell groups, each group having units of pluralities of other fuel cells,
   wherein the plurality of said fuel cell units in each cell group are connected in parallel, and
   wherein the plurality of said cell groups are connected in series by metal meshes with respective first ends embedded or fastened straddling respective anode layers of the plurality of said other fuel cells of said respective cell groups, and with second ends embedded or fastened straddling respective cathode layers of the plurality of said fuel cell units of the adjoining cell groups.

6. A solid electrolyte fuel cell configuration as set forth in claim 1, wherein the plurality of fuel cells are arranged in a cylindrical shape.

7. A solid electrolyte fuel cell configuration as set forth in claim 6, wherein:
   the plurality of fuel cells are arranged in two or more rings, and
   the anode-side metal meshes of end fuel cells of said rings and cathode-side metal meshes of fuel cells of adjoining rings are connected in series.

* * * * *